(12) United States Patent
Takeichi (10) Patent No.: US 7,840,294 B2
(45) Date of Patent: Nov. 23, 2010

(54) LAYOUT SETTING DEVICE FOR PROCESSING EYEGLASS LENS, EYEGLASS LENS PROCESSING APPARATUS, EYEGLASS FRAME MEASURING DEVICE AND CUP ATTACHING DEVICE, EACH HAVING THE SAME

(75) Inventor: Kyoji Takeichi, Gamagori (JP)

(73) Assignee: Nidek Co., Ltd., Aichi (JP)

( * ) Notice: Subject to any disclaimer, the term of this patent is extended or adjusted under 35 U.S.C. 154(b) by 290 days.

(21) Appl. No.: 11/711,678

(22) Filed: Feb. 28, 2007

(65) Prior Publication Data

US 2007/0213861 A1 Sep. 13, 2007

(30) Foreign Application Priority Data

Feb. 28, 2006 (JP) ............................. 2006-054098

(51) Int. Cl.
*G06F 19/00* (2006.01)
*B24B 51/00* (2006.01)
*B21D 33/00* (2006.01)
*G02C 7/02* (2006.01)
*G02C 13/00* (2006.01)

(52) U.S. Cl. ............................. 700/97; 451/5; 700/117; 700/164; 29/20; 351/177; 351/178

(58) Field of Classification Search ................. 700/117, 700/97; 451/5; 29/20; 351/177, 178
See application file for complete search history.

(56) References Cited

U.S. PATENT DOCUMENTS

| | | | |
|---|---|---|---|
| 5,228,242 A | 7/1993 | Matsuyama | |
| 5,333,412 A * | 8/1994 | Matsuyama | ..................... 451/5 |
| RE35,898 E | 9/1998 | Shibata et al. | |
| 6,045,432 A | 4/2000 | Shibata | |
| 6,478,657 B1 | 11/2002 | Shibata | |
| 6,481,095 B1 * | 11/2002 | Mizuno | ....................... 29/702 |
| 6,790,124 B2 | 9/2004 | Shibata | |
| 6,959,227 B2 * | 10/2005 | Okada et al. | ................ 700/164 |
| 7,125,314 B2 * | 10/2006 | Shibata | .......................... 451/5 |
| 2004/0153198 A1 * | 8/2004 | Okada et al. | ................ 700/164 |

FOREIGN PATENT DOCUMENTS

JP 2002-292547 A 10/2002

* cited by examiner

*Primary Examiner*—Albert DeCady
*Assistant Examiner*—Sivalingam Sivanesan
(74) *Attorney, Agent, or Firm*—Sughrue Mion, PLLC (57) ABSTRACT

A layout setting device that sets layout of a target lens shape used as a processing shape with respect to an eyeglass lens when the lens is processed to fit the lens to an eyeglass frame, the layout setting device includes: means for inputting data on the target lens shape; a display; a display control unit that switches between a first screen and a second screen to be displayed on the display or displays the first and second screens at the same time on the display, the first screen being used to input layout data including a pupillary distance of a user using the frame and a frame pupillary distance of the frame, and the second screen being used to measure a warp angle of the frame; and means for inputting the layout data using the first screen.

9 Claims, 7 Drawing Sheets

WARP ANGLE: 15°

LAYOUT SETTING DEVICE FOR PROCESSING EYEGLASS LENS, EYEGLASS LENS PROCESSING APPARATUS, EYEGLASS FRAME MEASURING DEVICE AND CUP ATTACHING DEVICE, EACH HAVING THE SAME

BACKGROUND OF THE INVENTION

1. Field of the Invention

The present invention relates to a layout setting device that sets layout of a target lens shape used as a processing shape with respect to an eyeglass lens when the lens is processed for fitting the lens to an eyeglass frame, an eyeglass lens processing apparatus, an eyeglass frame measuring device, and a cup attaching device, each having the layout setting device.

2. Description of the Related Art

When spectacles are formed by an eyeglass frame and an eyeglass lens, an optical center of a lens for a left eye generally corresponds to a pupil center of a user's left eye and an optical center of a lens for a right eye generally corresponds to a pupil center of a user's right eye. Accordingly, if geometric centers of left and right rim shapes (hereinafter referred to as target lens shapes) of the frame correspond respectively to the left and right pupil centers of the user when the user wears the frame, it is enough to fit the lenses to the frame so that the optical centers of the lenses correspond to the geometric centers of the target lens shapes of the frame. However, in actual, the geometric centers of the target lens shapes of the manufactured frame generally do not correspond to the pupil centers of the user. For this reason, when the periphery of the lens is processed to fit the lens to the frame, the geometric center of the target lens shape of the frame is positioned with respect to the optical center of the lens, that is, layout of the target lens shape with respect to the lens is set based on deviation in a lateral (substantially horizontal) direction and deviation in a longitudinal (substantially vertical) direction between the geometric center of the target lens shape of the frame and the pupil center of the user. Accordingly, a device for setting the above-mentioned layout is provided in an eyeglass lens processing apparatus called as an edger, an eyeglass frame measuring device called as a tracer, or a cup attaching device called as a blocker.

The deviation in the lateral direction (hereinafter referred to as lateral deviation (shift amount)) between the geometric center of the target lens shape of the frame and the optical center of the lens is obtained from a difference between a distance between the pupil centers of the user (hereinafter referred to as a pupillary distance: PD) and a distance between the geometric centers of the target lens shape of the frame (hereinafter referred to as a frame pupillary distance: FPD). In particular, it is preferable that the lateral deviation is obtained in consideration of warp in the case of a frame with significantly warped rims. For this reason, a technology, in which the lateral deviation (shift amount) is obtained (corrected) based on the warp angle of the frame (rim), has been proposed as disclosed in, for example, U.S. Pat. No. 5,333,412 (JP-A-4-93164).

As disclosed in U.S. Pat. No. 5,333,412 (JP-A-4-93164), in the case of a frame having rims, the warp angle is obtained from three-dimensional shape data of the rims, which is measured by the eyeglass frame measuring device. However, in the case of a rimless frame, a template (pattern) for the rimless frame or a demo lens (model lens) is generally measured by the eyeglass frame measuring device. Since two-dimensional shape (target lens shape) data is obtained from the measurement, the warp angle is not obtained.

Meanwhile, the warp angle of the rimless frame, to which the demo lens is fitted, may be visually confirmed using a protractor. However, preparation of the protractor is troublesome.

SUMMARY OF THE INVENTION

It is an object of the invention to provide a layout setting device that can easily obtain a warp angle of an eyeglass frame, an eyeglass lens processing apparatus, an eyeglass frame measuring device, and a cup attaching device, each having the layout setting device.

In order to achieve the object, the invention is characterized by having the following structure.

(1) A layout setting device that sets layout of a target lens shape used as a processing shape with respect to an eyeglass lens when the lens is processed to fit the lens to an eyeglass frame, the layout setting device comprising:

means for inputting data on the target lens shape;

a display;

a display control unit that switches between a first screen and a second screen to be displayed on the display or displays the first and second screens at the same time on the display, the first screen being used to input layout data including a pupillary distance of a user using the frame and a frame pupillary distance of the frame, and the second screen being used to measure a warp angle of the frame; and means for inputting the layout data using the first screen.

(2) The layout setting device according to (1), further comprising means for inputting the warp angle of the frame measured using the second screen.

(3) The layout setting device according to (2), wherein the display control unit displays an angle measuring line, which is rotated about a point on a reference line, on the second screen, and the warp angle inputting means inputs an amount or angle of rotation of the measuring line with respect to the reference line to input the warp angle of the frame.

(4) An eyeglass frame measuring device including the layout setting device according to (2), wherein the target lens shape data inputting means includes a measuring unit that obtains the target lens shape of the frame by measurement.

(5) A cup attaching device including the layout setting device according to (2) comprising a cup attaching unit that attaches a cup used as a processing jig to the lens.

(6) The layout setting device according to (2), further comprising an arithmetic unit that obtains lateral deviation in a direction of the pupillary distance between a geometric center of the target lens shape and an optical center of the lens based on the input layout data and the input warp angle.

(7) An eyeglass lens processing apparatus including the layout setting device according to (5), comprising:

a lens chuck that holds the lens;

a processing tool;

an arithmetic unit that obtains processing data based on the obtained lateral deviation; and a processing control unit that controls a positional relationship between the held lens and the processing tool and processes a periphery of the lens based on the basis of the obtained processing data.

(8) An eyeglass frame measuring device including the layout setting device according to (5), wherein the target lens shape data inputting means includes a measuring unit that obtains the target lens shape of the frame by measurement.

(9) A cup attaching device including the layout setting device according to (5), comprising a cup attaching unit that attaches a cup used as a processing jig to the lens.

DESCRIPTION OF THE PREFERRED EMBODIMENTS

Figure 1:
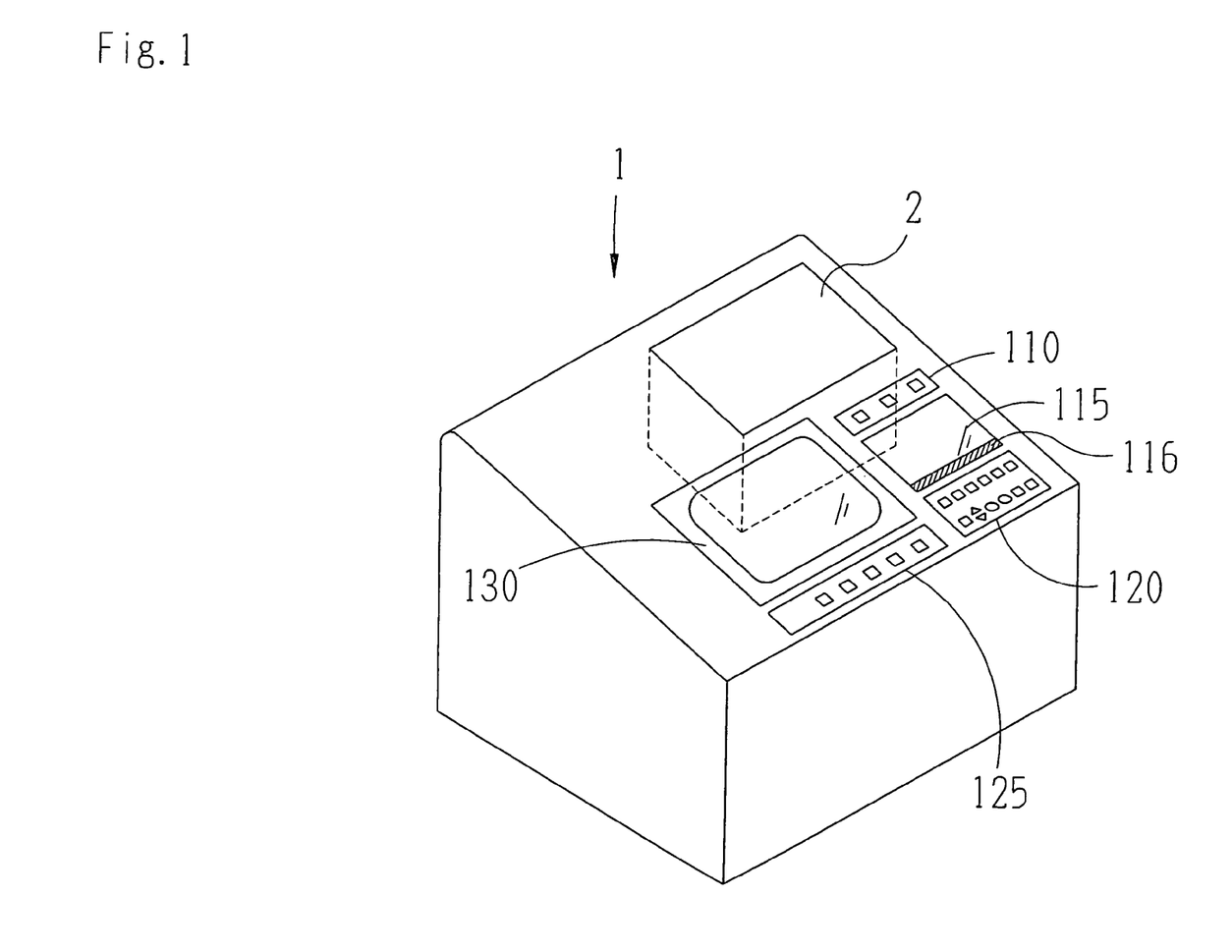
FIG. 1 is a view showing a schematic appearance of an eyeglass lens processing apparatus according to an embodiment of the invention.

Embodiments according to the invention will be described below with reference to accompanying drawings. FIG. 1 is a view showing a schematic appearance of an eyeglass lens processing apparatus according to an embodiment of the invention. An eyeglass frame measuring device 2 is provided in an eyeglass lens processing apparatus 1. Measuring devices as disclosed in U.S. Pat. No. 5,228,242 (JP-A-4-93163), US Re. 35898 (JP-A-5-212661), etc. can be used as the measuring device 2. Further, a switch panel (input unit) 110 for the measuring device 2, a switch panel (input unit) 120 and a touch panel type display (serving as both a displaying unit and an input unit) 115 forming a layout setting device, and a switch panel (input unit) 125 for the processing apparatus 1 including a processing starting switch and the like are provided on the upper surface of a case (body) of the processing apparatus 1. A lens LE to be processed is processed in a processing, chamber inside an opening/closing cover 130. Further, the measuring device 2 and the switch panel 110 may be formed to be separated from the processing apparatus 1. In addition, the display 115 and the switch panel 120 may also be formed to be separated from the processing apparatus 1, like the measuring device 2.

Figure 2:
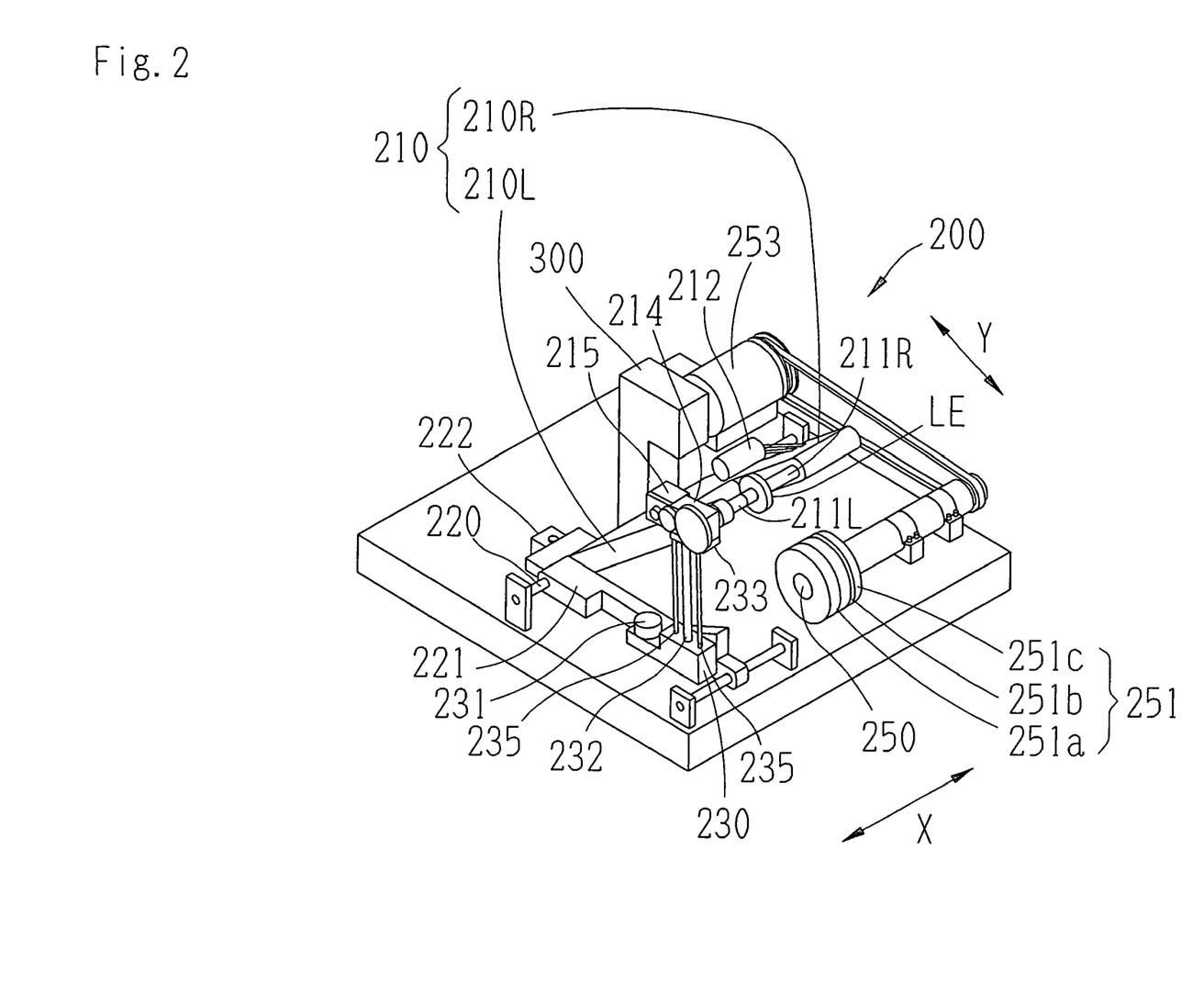
FIG. 2 is a view showing a schematic structure of a lens processing unit.

FIG. 2 is a view showing the schematic structure of a lens processing unit 200 provided in the processing apparatus 1. The lens LE is held (chucked) by two lens chucks 211L and 211R, which are included in a carriage 210, and is rotated by the lens chucks 211L and 211R. Further, the lens LE is ground (edged) by a grindstone 251 used as a processing tool, which is attached to a grindstone spindle 250 to be rotated. The grindstone 251 according to the this embodiment includes three grindstones, that is, a roughing grindstone 251a for glass, a roughing grindstone 251b for plastic, and a finishing grindstone 251c. The grindstone 251c includes a V-shaped groove used to form a bevel, and a flat-processing surface. The grindstone spindle 250 is rotated by a grindstone rotating motor 253 via torque transmission members such as a belt.

A block 214, which can be rotated about a central axis of the lens chuck 211L, is attached to a left arm 210L of the carriage 210. A lens rotating motor 215 is fixed to the block 214. The torque of the motor 215 is transmitted to the lens chuck 211L provided at the left arm 210L via torque transmission members such as a gear. Accordingly, the lens chuck 211L is rotated. In addition, the torque of the lens chuck 211L is transmitted to the lens chuck 211R, which is provided at the right arm 210R of the carriage 210, via torque transmission members such as a belt provided in the carriage 210. Accordingly, the lens chuck 211R is rotated in synchronization with the lens chuck 211L.

When processing is performed, a cup used as a processing jig is adhered to the front surface (front refracting surface) of the lens LE by an adhesive tape, and a base of the cup is mounted on a cup seat provided at the end of the lens chuck 211L. A lens holding (chucking) motor 212 for moving the lens chuck 211R in a central axis direction of the lens chuck 211R is fixed to the right arm 210R, and the torque of the motor 212 is transmitted to the lens chuck 211R via torque transmission members such as a belt and an axial movement member disposed in the carriage 210, so that the lens chuck 211R approaches the lens chuck 211L. A lens retainer is fixed to the end of the lens chuck 211R and the lens retainer comes in contact with the rear surface (rear refracting surface) of the lens LE, so that the lens LE is held (chucked) by the lens chucks 211L and 211R.

The carriage 210 is rotatably and slidably attached to a carriage shaft 220 parallel to the lens chucks 211L and 211R, and is moved together with a moving arm 221 in left and right directions (hereinafter, referred to as an "X-axis direction") that is central axis direction of the carriage shaft 220 by a motor 222. Further, a block 230 capable of being rotated about a central axis of the grindstone spindle 250 is attached to the moving arm 221. A motor 231 and two guide shafts 235 are fixed to the block 230, and a lead screw 232 is rotatably attached to the block 230. The torque of the motor 231 is transmitted to the lead screw 232 via torque transmission members such as a belt, so that the lead screw 232 is rotated. A guide block 233 coming in contact with the lower surface of the block 214 is fixed to the upper end of the lead screw 232. The guide block 233 is moved along the guide shafts 235. The carriage 210 is rotated about the carriage shaft 220 in up and down directions (in a direction in which a distance between the central axis of the lens chucks 211L and 211R and the central axis of the grindstone spindle 250 is changed. Hereinafter, referred to as a "Y-axis direction") due to the movement of the guide block 233. Further, a spring (not shown) is elastically provided between the carriage 210 and the moving arm 221, and the carriage 210 is always pushed downward, so that the lens LE is pressed against the grindstone 251. A known structure of a carriage, which is disclosed in U.S. Pat. No. 6,478,657 (JP-A-2001-18155), may be used as the above-mentioned structure of the carriage.

A drilling and grooving unit 300 and a lens measuring unit (a unit for measuring the position of an edge of a lens) 350 (see FIG. 3) are disposed on the rear side of the carriage 210. Known units, which are disclosed in U.S. Pat. No. 6,790,124 (JP-A-2003-145328), may be used as the drilling and grooving unit 300 and the lens measuring unit 350.

Next, the operation of the apparatus having the above-mentioned structure will be described with reference to a schematic block diagram of a control system shown in FIG. 3. The processing of a lens fitted to a rimless frame having large warp will be described in the following description. First, a template (pattern) for the rimless frame or a demo lens (model lens) is measured by a measuring unit 750 of the measuring device 2. Data on a target lens shape obtained from the measurement is input to a memory 501 by operation of a transmission switch of the switch panel 110 or 120, through an arithmetic and control unit 700 of the measuring device 2 and an arithmetic and control unit 500 of the layout setting device that also serves as an arithmetic and control unit of the processing apparatus 1. Further, when target lens shape data for one eye is obtained, target lens shape data for the other eye is obtained from mirror reverse of the obtained target lens shape data. In addition, the target lens shape data may be input from the outside through communication devices (not shown), or data read from data previously stored in a data memory (not shown) may be used as the target lens shape data.

Figure 3:
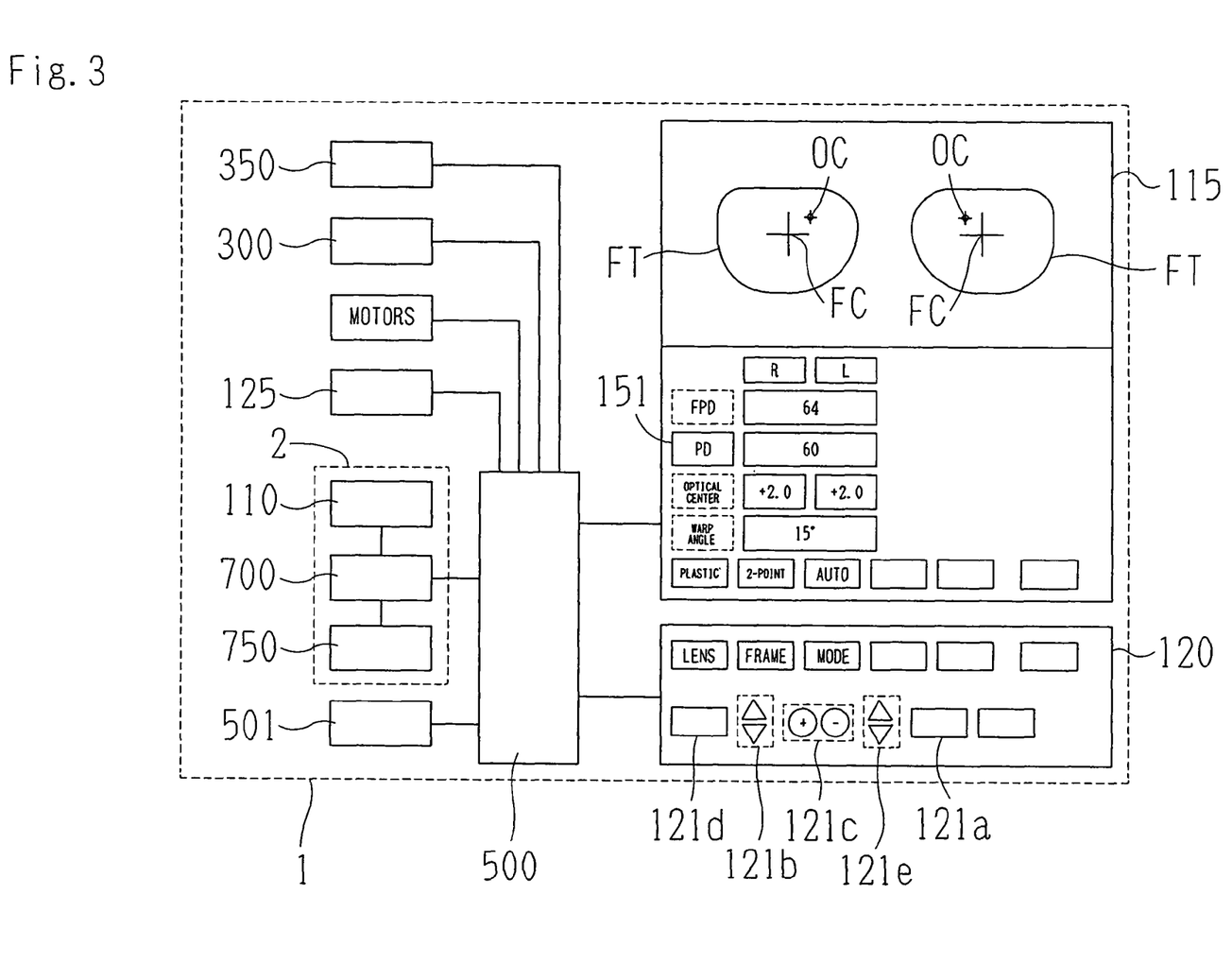
FIG. 3 is a schematic block diagram of a control system of the apparatus.

When the target lens shape data is input, a layout data input screen, which includes target lens shape graphics FT for left and right lenses, is displayed on the display 115 as shown in FIG. 3. Therefore, layout data can be input through operation of switches of the switch panel 120. FIG. 3 shows that an optical center processing mode (a mode where the cup is fixed at the optical center of the lens and the lens is held (chucked) by the lens chucks 211L and 211R) is selected by a switch 121a. A cursor 151 is moved to each item by operation of a switch 121b, and layout data, such as PD of a user and FPD of a frame, is then input by operation of a switch 121c. In the target lens shape graphics FT, FC indicates a geometric center of the target lens shape, and OC indicates an optical center of the lens. Further, processing conditions, such as a material of the lens, a type of the frame, and a processing mode, are input by operation of switches of the switch panel 120.

Next, a warp angle (inclination angle) of the frame (rim) is measured. In this case, the layout data input screen of the display 115 is switched into a warp angle measuring screen by operation of a switch 121d. The displaying on the display 115 is controlled by the arithmetic and control unit 500.

Figure 4:
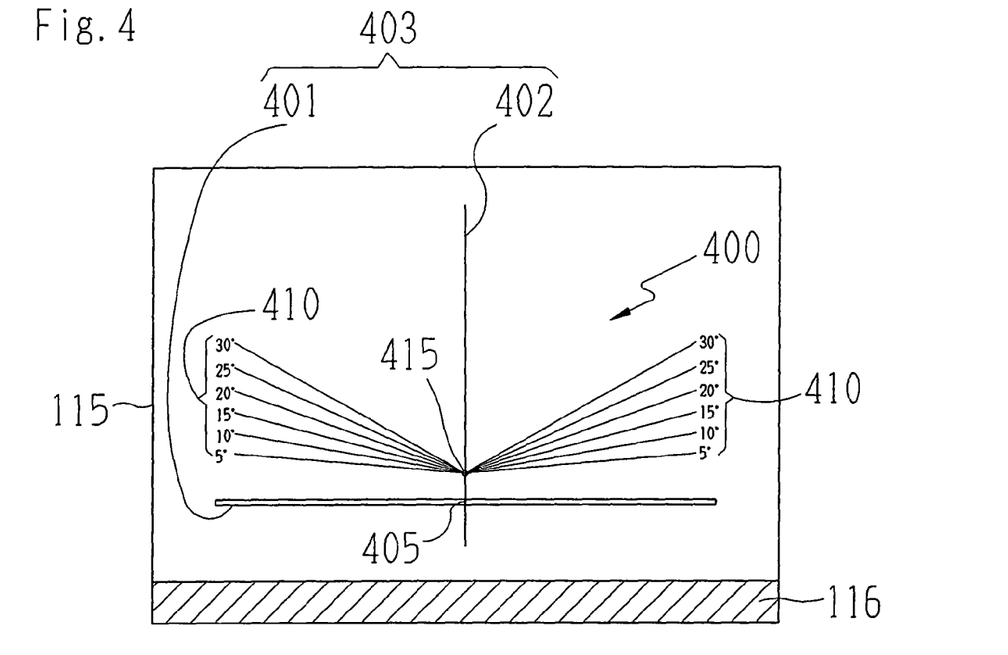
FIG. 4 is a view showing an example of a screen for measuring a warp angle of an eyeglass frame.

FIG. 4 is a view showing an example of a screen for measuring a warp angle of an eyeglass frame on the display 115. An warp angle measuring index 400 displayed on the screen includes a reference line (hereinafter referred to as a "horizontal reference line") 401 extending in a horizontal direction, a reference line (hereinafter referred to as a "vertical reference line") 402 that passes through a midpoint 405 of the horizontal reference line 401 and extends in a vertical direction, and angle measuring lines 410 that have a central point 415 positioned on the vertical reference line 402 and correspond to an angle in the range of 0 to 30° at an interval of 5° so as to be symmetric with each other with the horizontal reference line 401 as the 0° reference. Further, the reference lines 401 and 402 (hereinafter referred to as coordinate axes 403) and the measuring lines 410 are moved up and down by operation of the switch 121b. In addition, the only measuring lines 410 are moved up and down by operation of a switch 121e. Meanwhile, the interval of the measuring lines 410 may be set to a predetermined angle such as 1°.

A frame seat 116 is provided on the lower side of the display 115. The frame seat 116 has a height larger than the height of the screen of the display 115 so that the frame placed on the screen of the display 115 inclined toward the front side is not slipped down (see FIG. 1).

The measurement of the warp angle of the frame, which is performed by the warp angle measuring screen shown in FIG. 4, will be described with reference to FIG. 5. In the following description, the positions of the portions (bridge portions), which are closest to a nose, of left and right demo lenses fitted to the rimless frame are innermost points of the frame, and the positions of the portions (temple portions), which are closest to an ear, of the demo lenses are outermost points of the frame.

First, a frame 600 is placed on the screen 115 so that a center 601 (of a bridge) of the frame 600 in a horizontal direction (PD direction) is positioned on the reference line 402. Then, the coordinate axes 403 and the measuring lines 410 are moved up and down by operation of the switch 121b so that left and right innermost points 602a and 602b of the frame 600 are positioned on the reference line 401. After that, the measuring lines 410 are moved up and down by operation of the switch 121e so that an intersection 650 between a line connecting the left innermost point 602a with the left outermost point 603a and a line connecting the right innermost point 602b with the right outermost point 603b corresponds to the central point 415.

The warp angle (150 in FIG. 5) of the frame 600 is visually confirmed by the indication of the coordinate axes 403 and the measuring lines 410, and a value in a warp angle displaying field 660 is then changed by the operation of the switch 121c. As a result, the warp angle of the frame 600 is input. Further, the warp angle measuring screen is switched into the original layout data input screen by the operation of the switch 121d, so that the input warp angle is stored in the memory 501.

Figure 6:
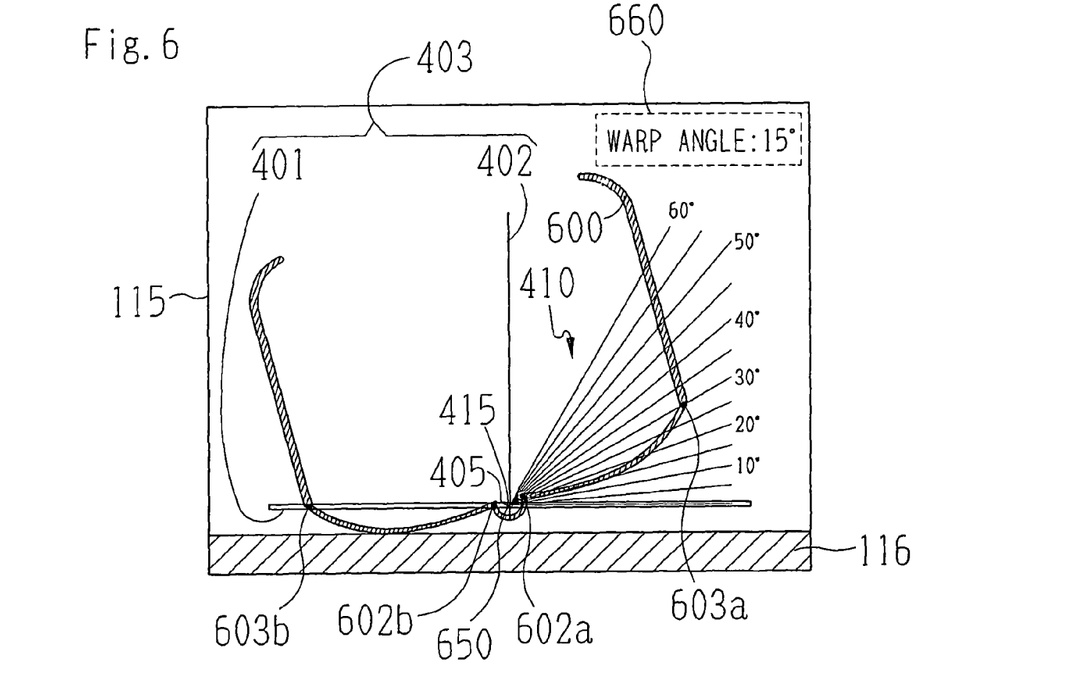
FIG. 6 is a view illustrating a modification of the measurement of the warp angle.

Meanwhile, when the frame 600 is placed on the display 115, the warp angle of the frame 600 may be visually confirmed by the only left or right innermost portion and outermost point as shown in FIG. 6. In this case, the half of the warp angle (30° in FIG. 6), which is visually confirmed, corresponding to one side of the frame 600 is input into the field 660 as the warp angle of the frame 600.

When the warp angle is input, the arithmetic and control unit 500 obtains lateral deviation (shift amount) based on the layout data, the warp angle, and the like. A method disclosed, for example, in U.S. Pat. No. 5,333,412 (JP-A-4-93164) may be used as a method of obtaining the lateral deviation (shift amount).

Figure 7:
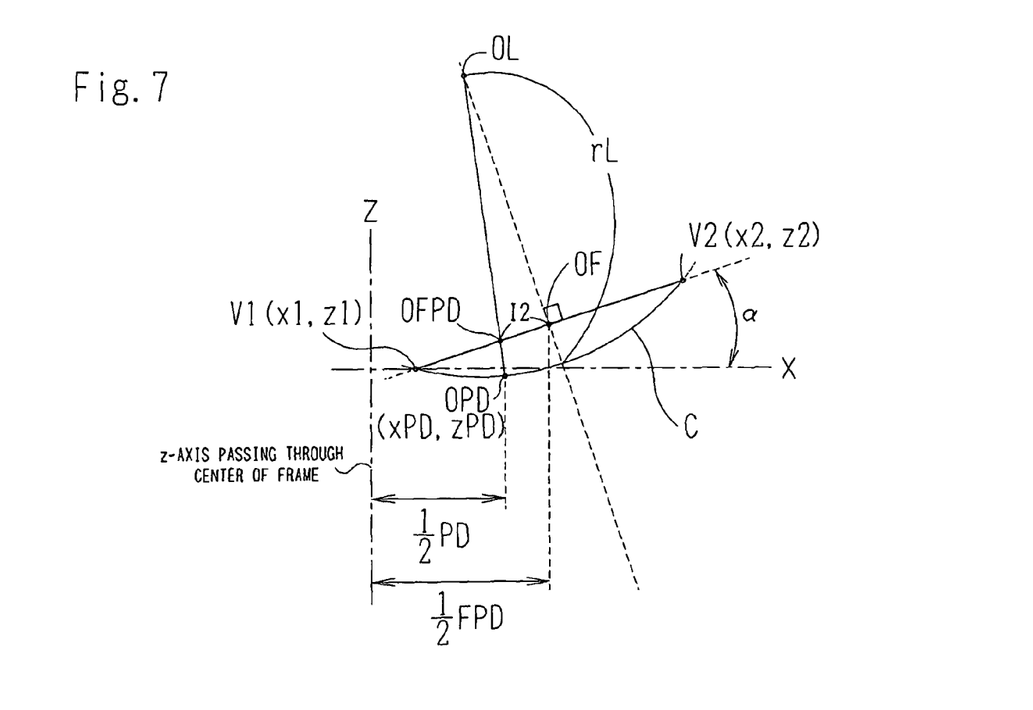
FIG. 7 is a view illustrating the calculation of lateral deviation (shift amount)

The method of obtaining the lateral deviation will be described in brief with reference to FIG. 7. The horizontal direction (PD direction) is used as an x-axis direction, the vertical direction is used as a y-axis direction, and a direction perpendicular to the x and y-axis directions is used as a z-axis direction. In the case when a target lens shape is inclined with respect to an X axis by an inclination angle $\alpha$ on an X-Z plane, the position of the portion closest to a nose in the target lens shape is indicated by a point V1 (x1, z1) and the position of the portion closest to an ear in the target lens shape is indicated by a point V2 (x2, z2). Further, a midpoint of a line connecting the point V1 with the point V2 is indicated by OF. The midpoint OF corresponds to a geometric center of the target lens shape. Furthermore, a radius of a curve C of the front surface of a lens is indicated by rL. In addition, a center of a circle, which has the radius of rL and passes through the points V1 and V2, is indicated by OL.

Next, a point OPD (xPD, zPD), which is positioned on the curve C of the front surface of the lens, is obtained from the curve C of the front surface of the lens and the input PD. Further, an intersection OFPD between a line that passes through the central point OL and the point OPD, and the line that connects the point V1 with the point V2, is obtained. Then, a distance l2 between the midpoint OF and the intersection OFPD is obtained as the lateral deviation.

When processing is performed, the arithmetic and control unit 500 obtains roughing data and finishing data based on the target lens shape data, the layout data, the lateral deviation, and the like. Then, the arithmetic and control unit 500 controls a distance between the rotating central axis of the lens LE (the central axis of the lens chucks 211L and 211R) and the rotational central axis of the grindstone 251 (the central axis of the grindstone spindle 250) based on each of the roughing data and the finishing data (although the lens LE is moved relative to the grindstone 251 by the movement of the carriage 210 in this embodiment, the grindstone may be moved relative to the lens). Accordingly, the periphery of the lens LE is processed. When grooving is performed on the peripheral surface (edge surface) of the flat-finished lens LE, grooving data is obtained and grooving is performed by control of the drilling and grooving unit 300. Further, when drilling is performed on the refracting surface of the lens LE, drilling data is obtained and drilling is performed by control of the drilling and grooving unit 300.

Figure 8:
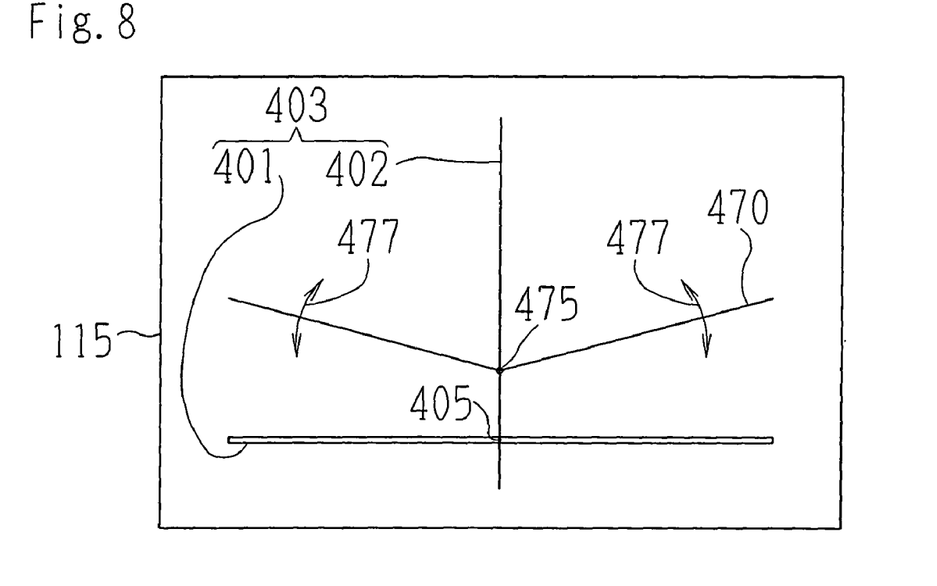
FIG. 8 is a view showing a modification of a screen for measuring a warp angle.

FIG. 8 is a view showing a modification of the warp angle measuring screen. The reference lines 401 and 402 (coordinate axes 403) are displayed on the display 115. Further, an angle measuring line 470, which is symmetric with respect to a central point 475 positioned on the reference line 402, is displayed. The measuring line 470 is rotated about the central point 475 in directions indicated by arrows 477 by operation of the switch 121c so as to be symmetric. Further, the coordinate axes 403 and the measuring line 470 are moved up and down by operation of the switch 121b. In addition, the measuring line 470 is moved up and down by operation of the switch 121e.

The measurement of the warp angle of the frame, which is performed by the warp angle measuring screen shown in FIG. 8, will be described with reference to FIG. 9. The intersection 650 corresponds to the central point 475 by operation of the switch 121e. Then, the innermost points 602a and 602b of the frame 600 and the outermost points 603a and 603b of the frame 600 are positioned on the measuring line 470 by operation of the switch 121c. A value in the warp angle displaying field 660 is changed by a rotation signal (an amount or angle of rotation) of the measuring line 470, which is input by the switch 121c. The warp angle measuring screen is switched into the original layout data input screen by the operation of the switch 121d, so that the input warp angle is stored in the memory 501.

Figure 5:
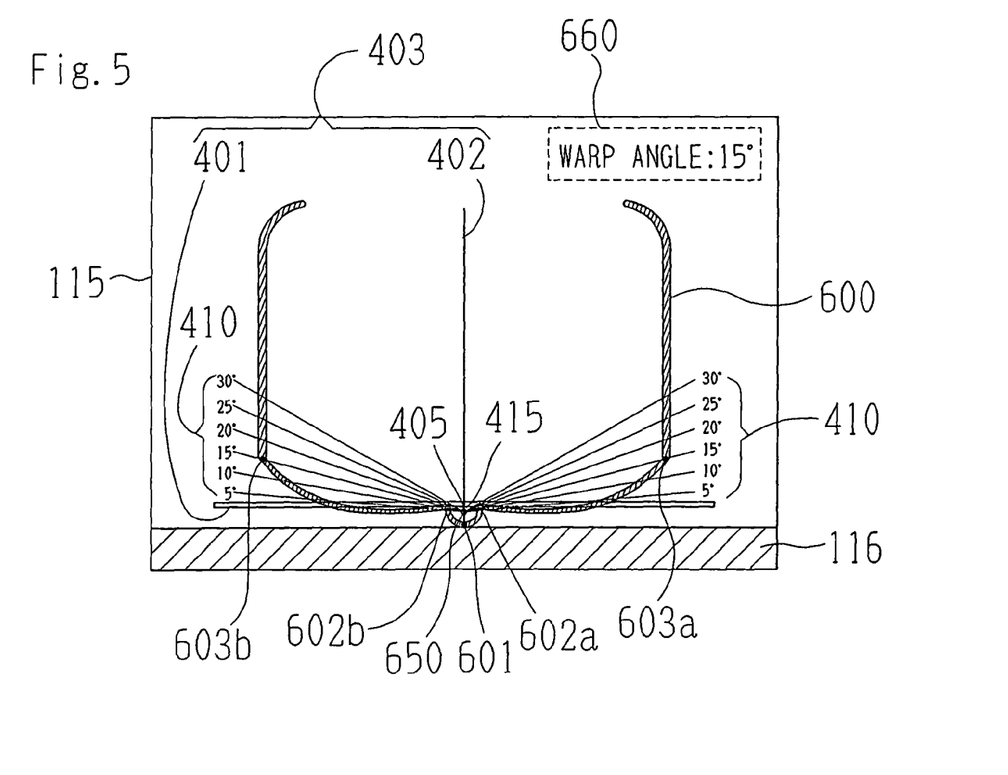
FIG. 5 is a view illustrating an example of the measurement of the warp angle.
Figure 9:
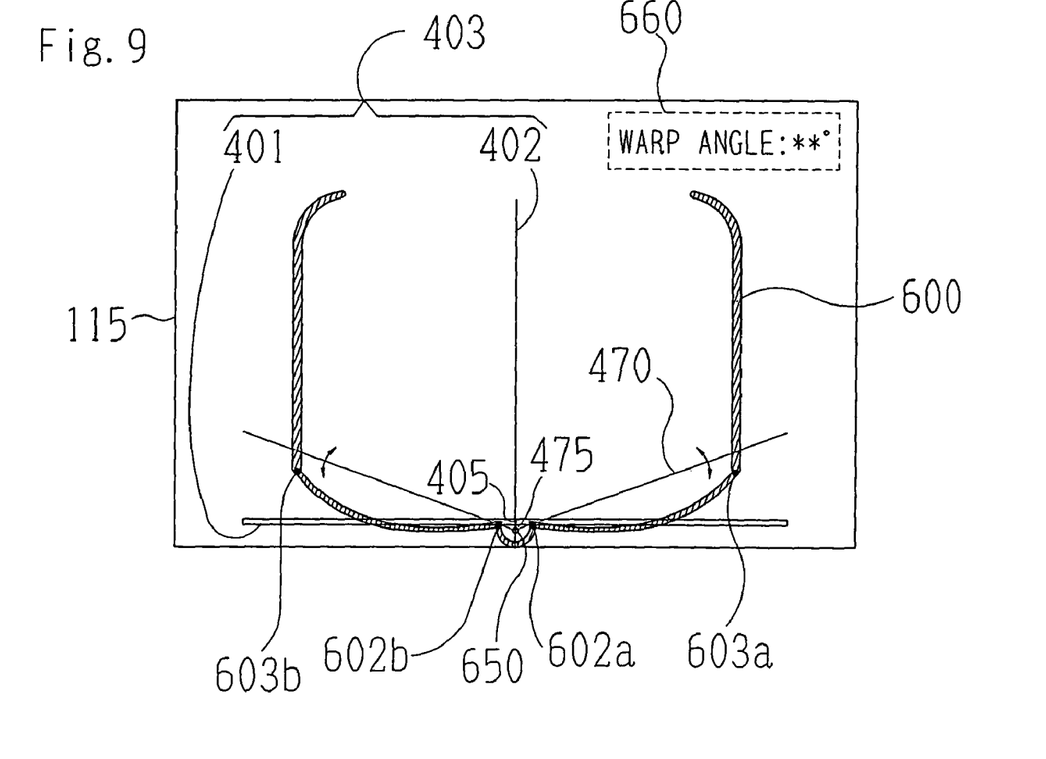
FIG. 9 is a view illustrating another modification of the measurement of the warp angle.

Meanwhile, as shown in FIGS. 5 and 9, it is preferable that the display 115 include a screen having a horizontal width larger than the horizontal width of the entire frame 600. However, the display 115 may include a screen that has a horizontal width larger than the horizontal width of one side portion of the frame 600 including at least the center 601 thereof. Further, when the size of a screen of the display 115 is large, the layout data input screen and the warp angle measuring screen may be displayed on the display at the same time without being switched therebetween.

Meanwhile, although the layout setting device has been integrally formed with the processing apparatus 1 in the above description, the invention is not limited thereto. For example, the layout setting device may be integrally formed with the measuring device 2, which is separated from the processing apparatus 1. Further, the layout setting device may be provided in peripheral devices, which are used to process the eyeglass lens, such as a cup attaching device for attaching a cup used as a processing jig to the eyeglass lens. In addition, the layout setting device may be separated from the processing apparatus so as to be used as a dedicated device.

Figure 10A:
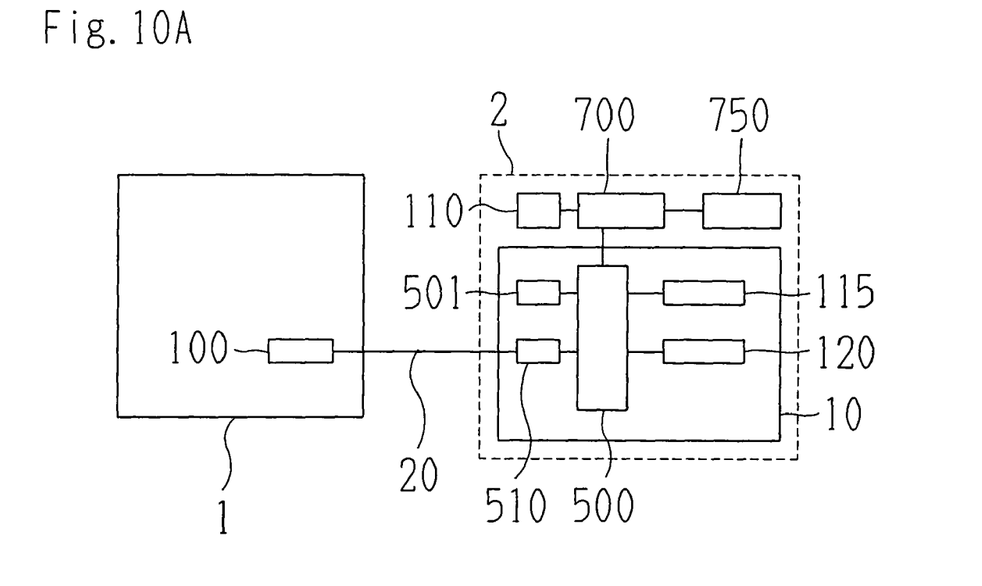
FIG. 10 is a schematic block diagram of an eyeglass lens processing system in the case that a layout setting device is separated from the eyeglass lens processing apparatus.
Figure 10B:
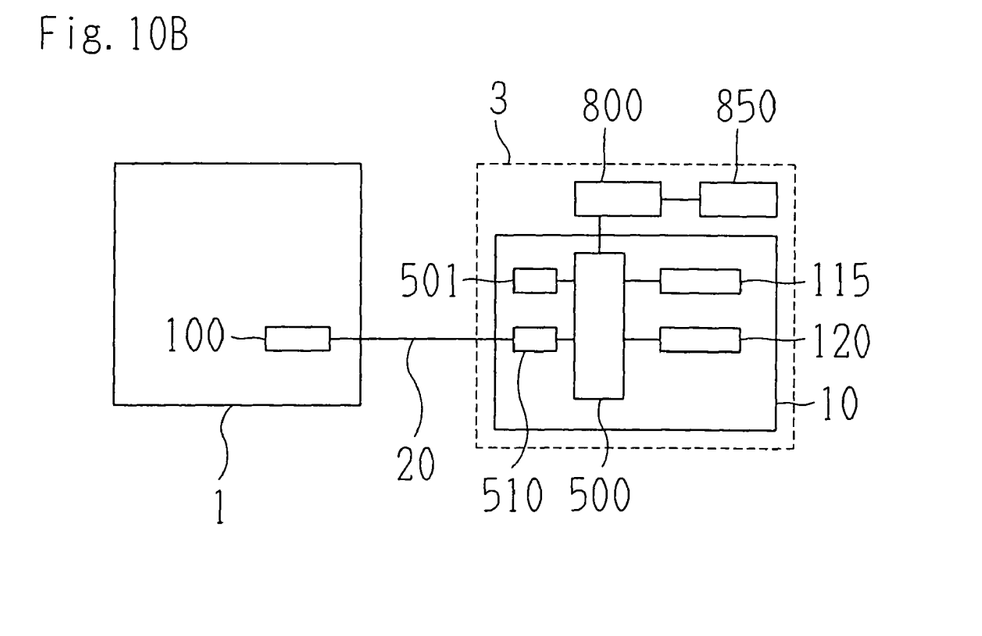

FIG. 10 is a schematic block diagram of an eyeglass lens processing system when a layout setting device 10 is separated from the processing apparatus 1. FIG. 10A exemplifies that the setting device 10 is provided in the measuring device 2, and FIG. 10B exemplifies that the setting device 10 is provided in a cup attaching device 3.

In FIG. 10A, the setting device 10 includes the display 115, the switch panel 120, the arithmetic and control unit 500, the memory 501, and the like. The arithmetic and control unit 500 is connected to the arithmetic and control unit 700 of the measuring device 2, which includes a measuring unit 750 (the arithmetic and control unit may serve as both the arithmetic and control unit 500 of the setting device 10 and the arithmetic and control unit 700 of the measuring device 2). In this case, target lens shape data obtained from the measuring device 2, layout data and a warp angle set by the setting device 10, and the like are output from an output unit 510 to an arithmetic and control unit 100 of the processing apparatus 1 via a communication line 20, by an instruction signal from the processing apparatus 1, the measuring device 2, or the setting device 10. Further, lateral deviation may be obtained by the arithmetic and control unit 500 of the setting device 10 and then output to the arithmetic and control unit 100 of the processing apparatus 1.

In FIG. 10B, the setting device 10 includes the display 115, the switch panel 120, the arithmetic and control unit 500, the memory 501, and the like. The arithmetic and control unit 500 is connected to an arithmetic and control unit 800 of the attaching device 3, which includes a cup attaching unit 850 (the arithmetic and control unit may serve as both the arithmetic and control unit 500 of the setting device 10 and the arithmetic and control unit 800 of the attaching device 3). In this case, layout data and a warp angle set by the setting device 10, and the like are output from the output unit 510 to the arithmetic and control unit 100 of the processing apparatus 1 via the communication line 20, by an instruction signal from the processing apparatus 1, the attaching device 3, or the setting device 10. Further, lateral deviation may be obtained by the arithmetic and control unit 500 of the setting device 10 and then output to the arithmetic and control unit 100 of the processing apparatus 1.

Meanwhile, the setting device 10 may be integrally formed with a device in which the measuring device 2 is integrally formed with the attaching device 3.

What is claimed is:

1. A layout setting device that sets layout of a target lens shape used as a processing shape with respect to an eyeglass lens, the layout setting device comprising:
   a target lens shape inputting unit that inputs target lens shape data of a template or a demo lens;
   a layout inputting unit that inputs layout data including data of a pupillary distance of a user;
   a display;
   a warp angle input unit that displays, on the display, a measuring screen that includes an angle measuring index for measuring a warp angle of an eyeglass frame, the angle measuring index including an x-axis reference line indicating 0° reference, a y-axis reference line perpendicular to the x-axis reference line and at least one angle measuring line, and that measures the warp angle based on a positional relationship between the eyeglass frame placed on the measuring screen and the displayed angle measuring index;
   a switching unit that switches a screen of the display to the measuring screen; and
   an arithmetic unit which obtains a shift amount in a direction of the pupillary distance and sets the layout of the target lens shape with respect to the eyeglass lens based on the input target lens shape data, the input layout data and the input warp angle data.

2. The layout setting device according to claim 1, wherein the warp angle inputting unit measures the warp angle based on an amount or angle of rotation of the angle measuring line with respect to the x axis reference line.

3. An eyeglass frame measuring device including the layout setting device according to claim 1, wherein the target lens shape data inputting unit includes a measuring unit that obtains the target lens shape data by measurement of the template or the demo lens.

4. A cup attaching device including the layout setting device according to claim 1 comprising a cup attaching unit that attaches a cup used as a processing jig to the lens.

5. An eyeglass lens processing apparatus including the layout setting device according to claim 1, comprising:
a lens chuck that holds the lens;
a processing tool;
an arithmetic unit that obtains processing data based on the obtained shift amount; and
a processing control unit that controls a positional relationship between the held lens and the processing tool and processes a periphery of the lens based on of the obtained processing data.

6. The layout setting device according to claim 1, wherein the switching unit switches between a layout screen and the measuring screen to be displayed on the display, the layout screen displaying a target lens shape graphic based on the input target lens shape data and being used to input the layout data, and the measuring screen being used to measure the warp angle.

7. The layout setting device according to claim 2, wherein the warp angle input unit includes a switch to send an instruction for rotating the angle measuring line about a predetermined point.

8. The layout setting device according to claim 1, wherein the warp angle input unit includes a switch to send an instruction for moving the angle measuring index within the measuring screen.

9. The layout setting device according to claim 1, wherein the display includes a frame seat which prevents the eyeglass frame from slipping down.

* * * * *